US009735632B2

(12) United States Patent
Iki et al.

(10) Patent No.: US 9,735,632 B2
(45) Date of Patent: Aug. 15, 2017

(54) ROTATING ELECTRIC MACHINE ROTOR

(71) Applicant: HONDA MOTOR CO., LTD., Tokyo (JP)

(72) Inventors: Tomotaka Iki, Wako (JP); Shingo Soma, Wako (JP); Eiji Shirado, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 490 days.

(21) Appl. No.: 14/391,605

(22) PCT Filed: Mar. 15, 2013

(86) PCT No.: PCT/JP2013/057544
§ 371 (c)(1),
(2) Date: Oct. 9, 2014

(87) PCT Pub. No.: WO2013/153917
PCT Pub. Date: Oct. 17, 2013

(65) Prior Publication Data
US 2015/0069874 A1    Mar. 12, 2015

(30) Foreign Application Priority Data

Apr. 10, 2012   (JP) ................................ 2012-089528

(51) Int. Cl.
*H02K 1/27* (2006.01)
*H02K 1/22* (2006.01)

(52) U.S. Cl.
CPC ........... *H02K 1/274* (2013.01); *H02K 1/2766* (2013.01); *H02K 1/22* (2013.01)

(58) Field of Classification Search
CPC ....... H02K 1/2766; H02K 1/274; H02K 1/276
(Continued)

(56) References Cited

U.S. PATENT DOCUMENTS 7,560,842 B2    7/2009  Hattori
7,705,503 B2 *  4/2010  Takahashi ............ H02K 1/2766
                                        310/156.53
(Continued)

FOREIGN PATENT DOCUMENTS

CN     1933297 A      3/2007
CN     1937358 A      3/2007
(Continued)

OTHER PUBLICATIONS

Office Action dated Mar. 3, 2016, issued in counterpart Chinese Patent Application No. 201380019124.8, with English translation. (8 pages).
(Continued)

*Primary Examiner* — Naishadh Desai
(74) *Attorney, Agent, or Firm* — Westerman, Hattori, Daniels & Adrian, LLP

(57) ABSTRACT

A void group made up of plural voids is formed on an outer circumferential side of a longitudinal end portion of a permanent magnet provided in a rotating electric machine rotor. The void group includes a first void and a second void row where plural second voids are formed at predetermined intervals at a position further radially outwards than the first void. A rib is formed between a pair of adjacent second voids of the second void row. End portions of the first void respectively overlap the pair of adjacent second voids. An imaginary line that extends along the center of the rib passes through at least part of the first void. A magnetic pole center-side end portion of the void group extends from the outer circumferential surface of the permanent magnet towards an outer circumferential surface of a rotor core.

10 Claims, 11 Drawing Sheets

(58) Field of Classification Search
   USPC ............ 310/156.01, 156.53, 156.56, 156.57,
                                                    310/156.11
   See application file for complete search history.

(56) References Cited

U.S. PATENT DOCUMENTS

| | | | | |
|---|---|---|---|---|
| 2008/0018190 A1* | 1/2008 | Takahata | ............... | H02K 1/2766 |
| | | | | 310/156.56 |
| 2008/0272667 A1* | 11/2008 | Ionel | ...................... | H02K 1/276 |
| | | | | 310/156.83 |
| 2013/0320797 A1* | 12/2013 | Vyas | .................... | H02K 1/2766 |
| | | | | 310/156.43 |
| 2014/0217849 A1* | 8/2014 | Soma | .................... | H02K 1/276 |
| | | | | 310/156.53 |

FOREIGN PATENT DOCUMENTS

| | | | |
|---|---|---|---|
| CN | 101106295 A | 1/2008 |
| JP | 09-019120 A | 1/1997 |
| JP | 10-285845 A | 10/1998 |
| JP | 2003-259615 A | 9/2003 |
| JP | 3487667 B2 | 1/2004 |
| JP | 2006-121765 A | 5/2006 |
| JP | 2011-199947 A | 10/2011 |
| WO | 2011/033397 A2 | 3/2011 |

OTHER PUBLICATIONS

Office Action dated May 7, 2015, issued in counterpart Japanese application No. 2014-510094. (2 pages).
International Search Report dated Jun. 11, 2013, issued in corresponding application No. PCT/JP2013/057544.

* cited by examiner

US 9,735,632 B2

ROTATING ELECTRIC MACHINE ROTOR

TECHNICAL FIELD

The present invention relates to a rotating electric machine rotor that is installed in an electric vehicle, a hybrid vehicle or the like.

BACKGROUND ART

In these days, neodymium magnets that contain a large amount of rare earth such as expensive dysprosium (Dy) are used to obtain high coercive force properties in rotating electric machines that are used to drive a vehicle. However, in association with the recent hike in prices of such rare earth, there are demands for high-performance rotating electric machines in which the demagnetizing capacity is restrained from being reduced or lost even though the contents of dy is reduced or no dy is contained.

For example, Patent Literature 1 proposes an IPM motor rotor having plural permanent magnets that are embedded in a rotor core in which the demagnetizing capacity of the embedded permanent magnets is attempted to be improved. As shown in FIG. 11, in a rotor 100 of this rotating electric machine, plural pairs of permanent magnets 117A, 117B are accommodated in corresponding permanent magnet accommodating portions 119A, 119B that have voids 120A, 120B at end portions thereof, respectively, in such a way that each pair of permanent magnets 117A, 117B are disposed substantially in a V-shaped fashion. Plural slits 121A, 122A, 123A and plural slits 121B, 122B, 123B are disposed between portions of magnetic pole surfaces 170A, 170B of the permanent magnets 170A, 170B that lie near magnetic pole end portions 172A, 172B and an outer circumferential surface 162 of a rotor core 160 in such a way as to be substantially perpendicular to the magnetic pole surfaces 170A, 170B. Radial lengths of the slits 121A, 122A, 123A and the slits 121B, 122B, 123B are gradually increased to be longer in the order in which the slits are aligned from central portions to the magnetic pole end portions 172A, 172B of the magnetic surfaces 170A, 170B of the permanent magnets 117A, 117B. The slits 121A, 122A, 123A and the slits 121B, 122B, 123B restrict magnetic fluxes that are produced from the central portions of the magnetic pole surfaces 170A, 170B from propagating towards portions between the magnetic pole end portions 172A, 172B and the outer circumferential surface 162 of the rotor core to thereby suppress the occurrence of magnetic saturation at portions near the magnetic pole end portions 172A, 172B of the permanent magnets 117A, 117B, whereby an improvement in demagnetizing capacity is attempted.

In addition, in a rotor described in Patent Literature 2, a single void is provided at each of end portions of a longitudinal outer circumferential side of a rectangular permanent magnet on a side facing an outer circumference of the rotor as a short-circuit preventing unit that prevents the formation of a magnetic flux short-circuit so as to increase the magnetic resistance at both the end portions of the magnet to thereby prevent the occurrence of a short-circuit in magnetic flux between end portions of adjacent permanent magnets, so that the torque of the magnet can be used effectively.

RELATED ART LITERATURE

Patent Literature

Patent Literature 1: JP-A-2011-199947 (FIG. 2)
Patent Literature 2: JP-B-3487667 (FIG. 3)

SUMMARY OF THE INVENTION

Problem that the Invention is to Solve

Incidentally, when a rotating electric machine is in operation, the demagnetizing field of a stator acts on a rotor in various directions according to the magnitude and lead angle of an electric current that energizes coils of the stator, the rotating angle of the rotor, the construction of a magnetic circuit in the rotor, and the like. The rotating electric machine described in Patent Literature 1 is designed so as to restrict the magnetic fluxes produced from the central portions of the magnetic pole surfaces 170A, 170B from propagating towards the portions between the magnetic pole end portions 172A, 172B and the outer circumferential surface 162 of the rotor core. However, the demagnetizing field of the stator that acts perpendicularly on the magnetic pole surfaces 170A, 170B of the permanent magnets 117A, 117B acts directly on the permanent magnets 117A, 117B, and this tends to demagnetize the permanent magnets 117A, 117B. Additionally, a salient difference between Lq and Ld (Lq−Ld) becomes important to generate a large reluctance torque. Normally, a reluctance torque is generated effectively by reducing the magnetic resistance of a LqIq magnetic path, while increasing the magnetic resistance of a LdId magnetic path so as to increase the salient difference. However, in the rotating electric machine described in Patent Literature 1, the slits 121A, 122A, 123A and the slits 121B, 122B, 123B are disposed on the LqIq magnetic paths, increasing the magnetic resistances of the LqIq magnetic paths, while the slits 121A, 122A, 123A and the slits 121B, 122B, 123B are disposed in the LdId magnetic paths in parallel to the LdId magnetic paths, reducing the magnetic resistance of the LdId magnetic paths. Because of this, it is difficult to generate the salient difference, as a result of which the resulting reluctance torque becomes small.

In addition, the rotor described in Patent Literature 2 is intended to provide the technology for preventing the magnetic flux short-circuit, and hence, nothing is described therein on the resistance to demagnetization.

The invention has been made in view of the problems described above, and an object thereof is to provide a rotating electric machine rotor that can disperse or reduce a demagnetizing field that acts on a permanent magnet so as to improve the resistance to demagnetization

Means for Solving the Problem

With a view to achieving the object, an invention according to claim 1 provides a rotating electric machine rotor including:

a rotor core (e.g., a rotor core 11 in embodiment) in which a magnet insertion hole (e.g., a magnet insertion hole 13 in embodiment) is formed; and a permanent magnet (e.g., a permanent magnet 12 in embodiment) that is inserted in the magnet insertion hole, wherein:

a void group (e.g., a void group 23 in embodiment) made up of plural voids (e.g., voids 22 in embodiment) is formed on an outer circumferential side of a longitudinal end portion (e.g., an end portion 21 in embodiment) of the permanent magnet;

the void group includes:
first void (e.g., a first void 22a in embodiment); and
second void row (e.g., a second void row 32 in embodiment) where plural second voids (e.g., second voids 22b in embodiment) are formed at predetermined intervals (e.g., intervals P2 in embodiment) at a position further radially outwards than the first void;

a rib (e.g., a rib 55 in embodiment) is formed between a pair of adjacent second voids of the second void row;

when seen from a direction parallel to an imaginary line (e.g., an imaginary lint 60 in embodiment) that extends along a center of the rib in a width direction thereof, end portions of the first void on both sides thereof (e.g., end portions 41 in embodiment) in a direction along an outer circumferential surface (e.g., an outer circumferential surface 24 in embodiment) of the permanent magnet respectively overlap the pair of adjacent second voids of the second void row in the direction along the outer circumferential surface of the permanent magnet;

the imaginary line that extends along the center of the rib in the width direction thereof passes through at least part of the first void; and a magnetic pole center-side end portion of the void group extends from the outer circumferential surface of the permanent magnet towards an outer circumferential surface of the rotor core.

An invention set forth in claim 2 is characterized in that, in addition to the configuration of claim 1, the void group includes a first void row (e.g., a first void row 31 in embodiment) where a plurality of the first voids are formed at predetermined intervals along the outer circumferential surface of the permanent magnet.

An invention set forth in claim 3 is characterized in that, in addition to the configuration of claim 2, when a first imaginary line (e.g., a first imaginary line 35 in embodiment) that connects a center (e.g., a center O1 in embodiment) of one of a pair of adjacent first voids and a center (e.g., a center O3 in embodiment) of the second void forms an angle of θ with a secondary imaginary line (e.g., a second imaginary line 36 in embodiment) that connects a center (e.g., a center O2 in embodiment) of the other of the pair of first voids and the center of the second void, θ<90°.

An invention set forth in claim 4 is characterized in that, in addition to the configuration of any one of claims 1 to 3, when seen from an axial direction, the voids each is formed into a circular shape.

An invention set forth in claim 5 is characterized in that in addition to the configuration of any one of claims 1 to 3, when seen from an axial direction, the voids each is formed into a polygonal shape (e.g., a square void 62, a rhombus void 63, a regular hexagonal void 64 in embodiment).

An invention set forth in claim 6 is characterized in that, in addition to the configuration of claim 5, when seen from the axial direction, the voids each is formed substantially into a regular hexagonal shape.

An invention set forth in claim 7 is characterized in that, in addition to the configuration of any one of claims 1 to 6, the voids on magnetic pole center-side ends of the void rows are disposed closer to a magnetic pole end side in an order of the void rows aligned from the outer circumferential surface of the permanent magnet towards the outer circumferential surface of the rotor core.

An invention set forth in claim 8 is characterized in that, in addition to the configuration of any one of claims 2 to 7, the void group is formed closer to an outer circumferential surface side of the rotor core in the direction along the outer circumferential surface of the permanent magnet rather than a circumferential end portion of the outer circumferential surface of the permanent magnet.

An invention set forth in claim 9 provides a rotating electric machine rotor (e.g., rotor 10 in an embodiment) including:

a rotor core (e.g., a rotor core 11 in embodiment) in which a magnet insertion hole (e.g., a magnet insertion hole 13 in embodiment) is formed; and a permanent magnet (e.g., a permanent magnet 12 in embodiment) that is inserted in the magnet insertion hole, wherein:

a void group (e.g., a void group 23 in embodiment) made up of plural voids (e.g., voids 22 in embodiment) is formed on an outer circumferential side of a longitudinal end portion (e.g., an end portion 21 in embodiment) of the permanent magnet;

the void group includes:

a first void row (e.g., a first void row 31 in embodiment) where plural first voids (e.g., first voids 22a in embodiment) are formed at predetermined intervals (e.g., intervals P1 in embodiment) along an outer circumferential surface of the permanent magnet when seen from an axial direction; and a second void (e.g., a second void 22b in embodiment) that is formed between a pair of adjacent first voids at a position further radially outwards than the first void row;

a rib (e.g., a rib 57 in embodiment) is formed between the second void and one of the pair of first voids;

an imaginary line (e.g., an imaginary line 46 in embodiment) that extends along a center of the rib in a width direction thereof passes through the other of the pair of first voids;

a magnetic pole center-side end portion of the void group extends from the outer circumferential surface of the permanent magnet towards an outer circumferential surface of the rotor core.

An invention set forth in claim 10 provides a rotating electric machine rotor (e.g., rotor 10 in an embodiment) including:

a rotor core (e.g., a rotor core 11 in embodiment) in which a magnet insertion hole (e.g., a magnet insertion hole 13 in embodiment) is formed; and a permanent magnet (e.g., a permanent magnet 12 in embodiment) that is inserted in the magnet insertion hole, wherein:

a void group (e.g., a void group 23 in embodiment) made up of plural voids (e.g., voids 22 in embodiment) is formed on an outer circumferential side of a longitudinal end portion (e.g., an end portion 21 in embodiment) of the permanent magnet;

the void group includes:

a first void row (e.g., a first void row 31 in embodiment) where plural first voids (e.g., first voids 22a in embodiment) are formed at first intervals along an outer circumferential surface of the permanent magnet when seen from an axial direction;

a second void row (e.g., a second void row 32 in embodiment) where plural second voids (e.g., second voids 22b in embodiment) are formed at second intervals along the outer circumferential surface of the permanent magnet at a position further radially outwards than the first void row; and a third void (e.g., a third void 22c in embodiment) that is formed between a pair of adjacent second voids at a position further radially outwards than the second void row;

a rib (e.g., a rib 71 in embodiment) is formed between the third void and one of the pair of second voids;

an imaginary line (e.g., an imaginary line 72 in embodiment) that extends along a center of the rib in a width direction thereof passes through the first void; and a magnetic pole center-side end portion of the void group extends from the outer circumferential surface of the permanent magnet towards an outer circumferential surface of the rotor core.

Advantage of the Invention

According to the invention of claim 1, when the rotating electric machine is in operation, even in the event that demagnetizing fields act on the outer circumferential surface of the permanent magnet from various directions, it is possible to restrict the concentration of the demagnetizing fields to a specific location of the permanent magnet, whereby it is possible to restrict the demagnetization of the specific location at the end portion of the permanent magnet.

According to the invention of claim 2, the demagnetizing fields can be dispersed in the direction along the outer circumferential surface of the permanent magnet more effectively.

According to the invention of claim 3, the other of the pair of first voids is situated on the path of the demagnetizing field that passes through the rib formed between the one of the pair of first voids and the second void. Consequently, even though the demagnetizing field acts along the extending direction of the rib formed between the one of the pair of first voids and the second void, the demagnetizing field can be restricted from acting directly on the end portion of the permanent magnet. Thus, the demagnetizing field acting on the end portion of the magnetic field can be dispersed effectively in the direction along the outer circumferential surface of the permanent magnet to thereby restrict demagnetization.

According to the invention of claim 4, it is possible to restrict an angular portion (a bent portion) from being formed at part of the rib formed between the voids, whereby when the rotor rotates, the stress resulting from a centrifugal force acting on the rotor core is dispersed to the whole of the rib, thereby making it possible to restrict the reduction in strength of the rotor core more effectively.

According to the inventions of claims 5 and 6, the thickness of the rib between the voids in one void row and the thickness of the rib between voids of the adjacent void rows can be made uniform, whereby the local reduction in strength of the ribs is restricted. Consequently, it is possible to restrict the reduction in strength of the ribs while ensuring the size of the voids.

According to the invention of claim 7, it is possible to restrict effectively the magnetic fluxes that propagate from the central portion of the magnetic pole towards the outer end portion of the magnetic pole of the permanent magnet.

According to the invention of claim 8, part of the demagnetizing fields that act on the outer circumferential surface of the permanent magnet can be dispersed more to the outer circumferential surface side of the rotor core in the direction along the outer circumferential surface of the permanent magnet than at the circumferential end portion of the outer circumferential surface of the permanent magnet by the rib between the voids. Therefore, it is possible to restrict the specific location at the end portion of the permanent magnet from being demagnetized more effectively.

According to the invention of claim 9, the other of the pair of first voids is situated on the path of the demagnetizing field that passes through the rib along the rib. Consequently, in addition to the same advantage as that of claim 1, even though the demagnetizing field acts along the extending direction of the rib, the demagnetizing field can be restricted from acting directly on the end portion of the permanent magnet to thereby be dispersed in the direction along the outer circumferential surface of the permanent magnet effectively.

According to the invention of claim 10, the first void is situated on the path of the demagnetizing field that passes through the rib along the rib. Consequently, in addition to the same advantage as that of claim 1, even though the demagnetizing field acts along the extending direction of the rib, the demagnetizing field can be restricted from acting directly on the end portion of the permanent magnet, and the demagnetizing field acting on the end portion of the permanent magnet can be dispersed in the direction along the outer circumferential surface of the permanent magnet effectively.

MODE FOR CARRYING OUT THE INVENTION

Figure 1:
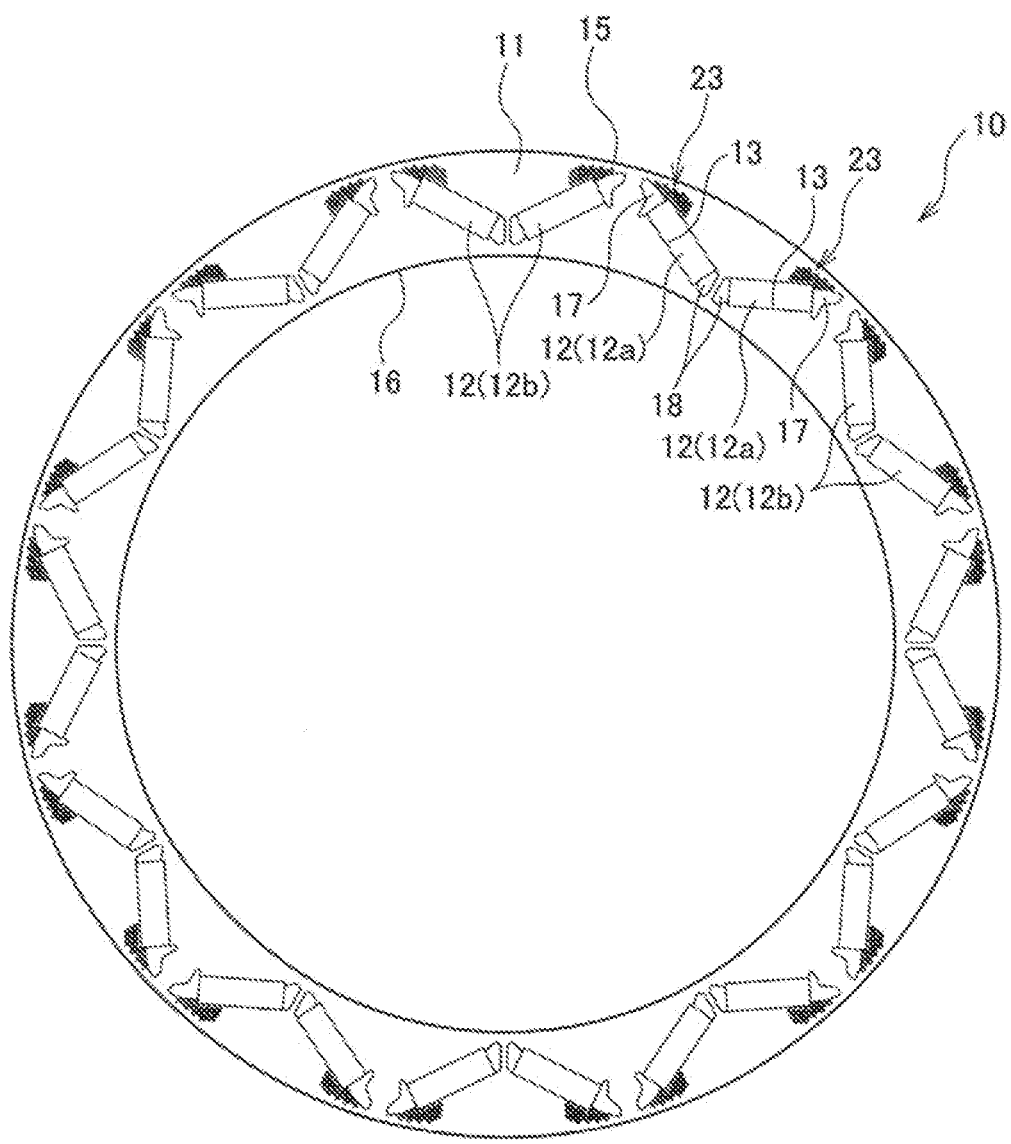
FIG. 1 is a front view of a rotor of a first embodiment according to the invention.

Hereinafter, referring to the accompanying drawings, embodiments of the invention will be described in detail. The drawings should be seen in a direction in which reference numerals look properly.

First Embodiment

As shown in FIG. 1, a rotating electric machine rotor 10 of this embodiment is disposed rotatably inside a stator, not shown, with a gap defined therebetween. The rotor 10 includes a rotor core 11 that is formed by laminating many electromagnetic steel plates having the same circular disc shape and plural permanent magnets 12 that are individually embedded in plural magnet insertion holes 13 that are provided in the rotor 11 with a filling material.

The plurality of magnet insertion holes 13 are formed in pairs at predetermined intervals, with each pair of magnet insertion holes 13 formed substantially into a V shape that is opened toward an outer circumference of the rotor core 11, and the permanent magnets 12 are inserted into the magnet insertion holes 13 so that the polarities of the permanent magnets so inserted change alternately by each pair of magnet insertion holes 13. For example, assuming that outer circumferential sides of a pair of permanent magnets 12*a* are N poles, outer circumferential sides of the next pair of permanent magnets 12*b* are S poles.

Figure 2:
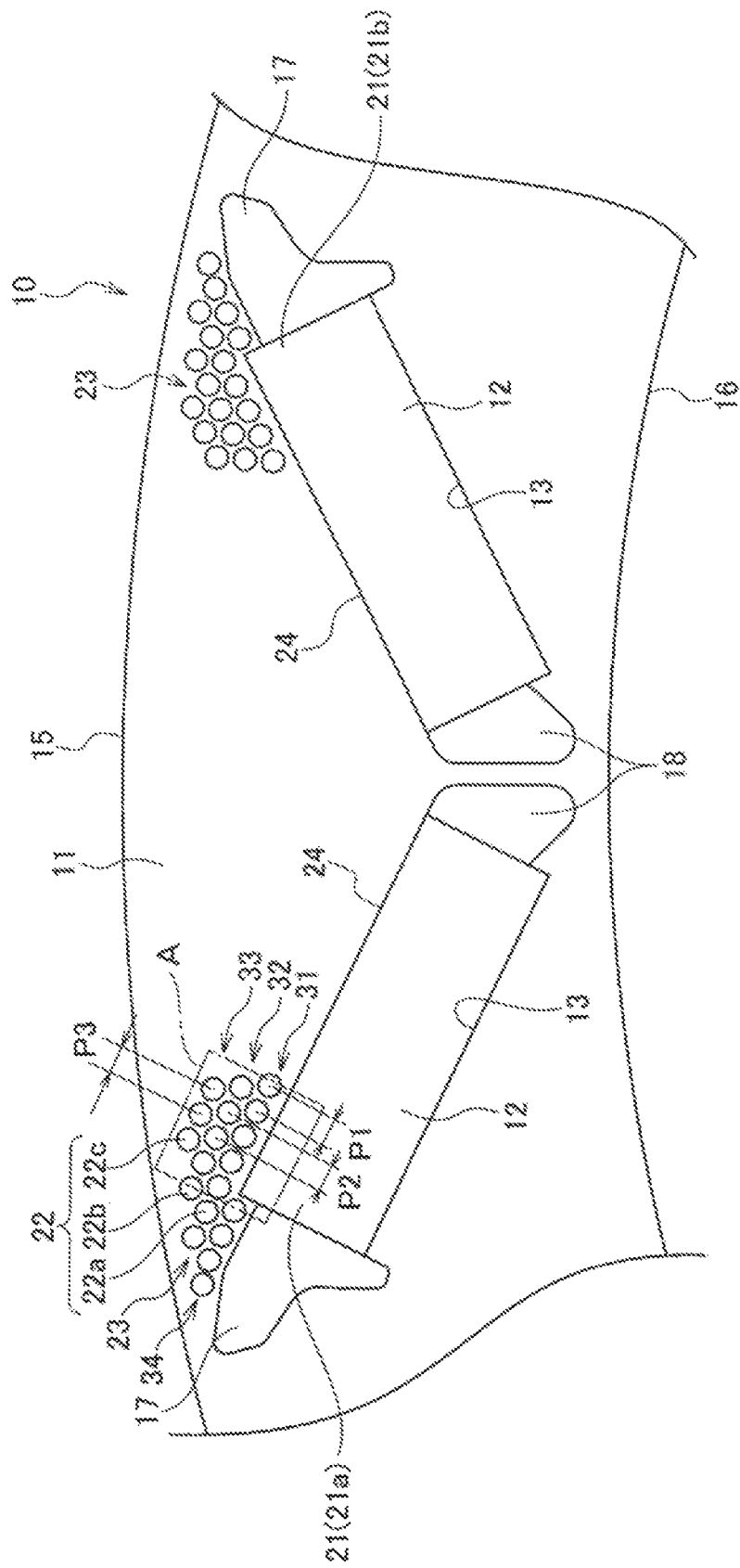
FIG. 2 is an enlarged view of a portion of FIG. 1.

Also, referring to FIG. 2, a void 17 is formed at an end portion of the magnet insertion hole 13 that lies near an outer circumferential surface 15 of the rotor core 11 in such a way as to be continuous with the magnet insertion hole 13. Additionally, a void 18 is also formed at an end portion of the magnet insertion hole 13 that lies near an inner circumferential surface 16 of the rotor core 11 in such a way as to be continuous with the magnet insertion hole 13. Consequently, with the permanent magnet 12 embedded in the magnet insertion hole 13, the voids 17, 18 for preventing a magnetic flux short-circuit are provided at both end portions of the permanent magnet 12.

A void group 23 made up of plural voids 22 having a circular shape is formed on an outer circumferential side of a longitudinal outer end portion 21 (21*a*, 21*b*) of the permanent magnet 12. The void group 23 includes a first void row 31 in which plural first voids 22*a* are formed at predetermined intervals P1 along an outer circumferential surface 24 of the permanent magnet 12, a second void row 32 that lies further radially outwards than the first void row 31 and in which plural second voids 22*b* are formed at predetermined intervals P2, a third void row 33 that lies further radially outwards than the second void row 32 and in which plural third voids 22*c* are formed at predetermined intervals P3, and a side void row 34 that lies on an extension of an outer circumferential side of the outer circumferential surface 24 of the permanent magnet 12 and in which voids are formed at predetermined intervals on an outer circumferential side of the void 17. The void group 23 may be formed of the first void row 31 and the second void row 32 and can include further a fourth void row in a position lying further radially outwards than the third void row 33.

In addition, a magnetic pole center-side end portion of the void group 23 extends from an outer circumferential surface 24 of the permanent magnet 12 towards the outer circumferential surface 15 of the rotor core 11. In particular, voids 22*a*, 22*b*, 22*c* of the first, second and third void rows 31, 32, 33 that are situated at the magnetic pole center-side end portion of the void group 23 are disposed so as to lie closer to the outer end portion 21*a*, 21*b* of the magnetic pole in the order in which they are aligned from the outer circumferential surface 24 of the permanent magnet 12 towards the outer circumferential surface 15 of the rotor core 11.

Figure 3A:
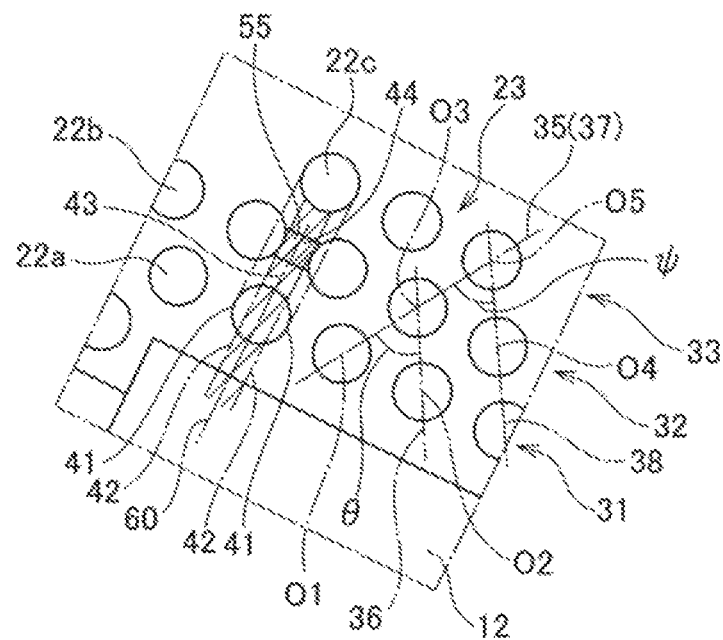
FIG. 3A shows an enlarged view of a surrounded portion that is denoted by A in FIG. 2 which depicts a positional relationship between voids.

Here, as shown in FIG. 3A, in the void group 23, an angle θ formed between a first imaginary line 35 which connects a center O1 of one of a pair of adjacent first voids 22*a* and a center O3 of a second void 22*b* that is situated between a pair of first voids 22*a* in a direction along the outer circumferential surface 24 of the permanent magnet 12 and a second imaginary line 36 which connects a center O2 of the other of the pair of first voids 22*a* and the center O3 of the second void 22*b* is set to be smaller than 90° (θ<90'). In addition, an angle ψ formed between a third imaginary line 37 which connects the center O3 of one of a pair of adjacent second voids 22*b* and a center O5 of a third void 22*c* that is situated between the pair of second voids 22*b* in a direction along the outer circumferential surface 24 of the permanent magnet 12 and a fourth imaginary line 38 which connects a center O4 of the other of the pair of second voids 22*b* and the center O5 of the third void 22*c* is also set to be smaller than 90° (ψ<) 90°. In FIG. 3A, although the first imaginary line 35 and the third imaginary line 37 are shown as constituting the same straight line, a configuration may be adopted in which the first imaginary line 35 and the third imaginary line 37 constitute different straight lines.

Additionally, as shown in FIG. 3A, end portions 41 of the first void 22*a* on both sides thereof in a direction along the outer circumferential surface 24 of the permanent magnet 12 overlap a pair of adjacent second voids 22*b* of the second void row 32 in the direction along the outer circumferential surface 24 of the permanent magnet 12 when seen from a direction normal to the outer circumferential surface 24 of the permanent magnet 12 (a direction parallel to an imaginary line 60 that extends along a center of a rib 55, which will be described later, in a width direction).

In addition, the imaginary line 60 that extends along the center of the rib 55 formed between the pair of adjacent second voids 22*b*, 22*b* of the second void row 32 in the width direction passes through at least part of the first void 22*a*. In the case of the void 22 being circular as in this embodiment, it is possible to specify that at least part of the first void 22*a* is situated within an area 43 that is sandwiched by respective tangents 42, 42 to the pair of adjacent second voids 22*b* at a portion 44 where the pair of adjacent second voids 22*b* of the second void row 32 lie closest to each other.

Figure 3B:
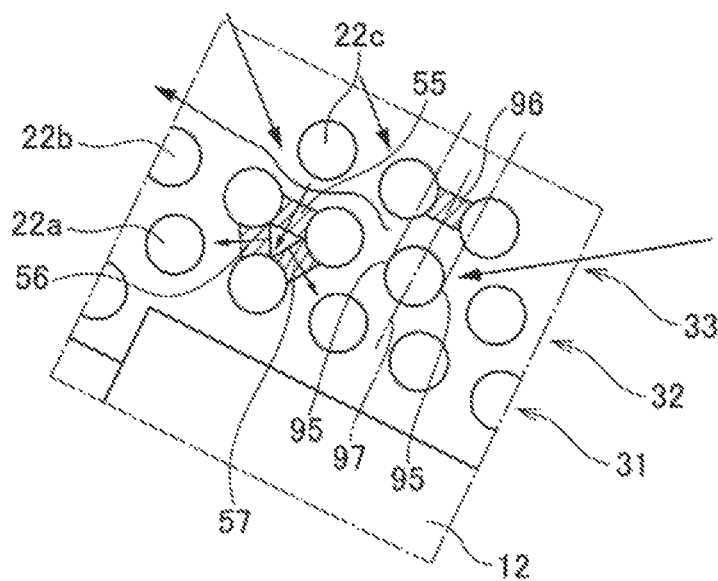
FIG. 3B shows an enlarged view of the surrounded portion that is denoted by A in FIG. 2 which depicts ribs that are formed between voids.

By adopting this configuration, as shown in FIG. 3B, ribs 55, 56, 57 are formed individually between the pair adjacent second voids 22*b*, between one of the pair of second voids 22*b* and the first void 22*a* and between the other of the pair of second voids 22*b* and the first void 22*a*. Thus, at least three ribs 55, 56, 57 that are connected together at branch portions are formed. When the rotating electric machine is in operation, a demagnetizing field acts on the end portions of the permanent magnet through the three ribs 55, 56, 57 from various directions according to the magnitude and lead angle of an electric current that energizes coils of the stator, the rotating angle of the rotor, the construction of a magnetic circuit in the rotor, and the like. However, in the event that the demagnetizing field that acts from a predetermined direction is directed to the permanent magnet 12 by passing through any one of the three ribs 55, 56, 57, the demagnetizing field acts on the permanent magnet 12 while being divided into the other two ribs at the branch portions. Consequently, the demagnetizing field that acts on the end portion 21 of the permanent magnet 12 is dispersed in the direction along the outer circumferential surface 24 of the permanent magnet 12. Thus, when the rotating electric machine is in operation, also, in the event that the demagnetizing field acts from the various directions, the demagnetizing field is restricted from being concentrated to a specific location on the end portion 21 of the permanent magnet 12, thereby making it possible to suppress the occurrence of demagnetization at the specific location.

In addition, at least three ribs 55, 56, 57 are formed between the first void 22*a* and the pair of second voids 22*b*, and therefore, compared with the conventional case where the single void is formed, it is possible to suppress the reduction in strength of the rotor core. Further, the ribs that are formed between the void rows also function as magnetic paths in a q-axis direction (LqIq magnetic paths), and therefore, magnetic fluxes become easy to pass in the q-axis direction, increasing an inductance (Lq) in the q-axis direction. Consequently, the saliency (Lq−Ld) can be increased, thereby making it possible to generate reluctance torque effectively.

Additionally, a positional relationship between a second void 22b and a pair of adjacent third voids 22c of the third void row 33 is also similar to the positional relationship between the first void 22a and the pair of adjacent second voids 22b of the second void row 32.

Namely, as shown in FIG. 3B, end portions 95 of the second void 22b on both sides thereof in a direction along the outer circumferential surface 24 of the permanent magnet 12 overlap a pair of adjacent third voids 22c of the third void row 33 in the direction along the outer circumferential surface 24 of the permanent magnet 12 when seen from a direction normal to the outer circumferential surface 24 of the permanent magnet 12. In addition, an imaginary line 97 that extends along a center of a rib 96 that is formed between the pair of adjacent third voids 22c, 22c of the third void row 33 in a width direction passes through at least part of the second void 22b.

Figure 4A:
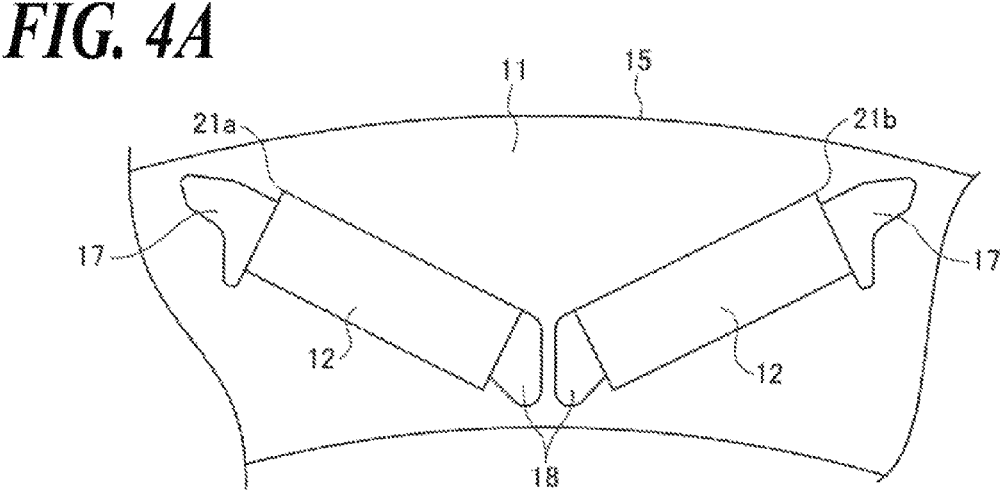
FIG. 4A shows an enlarged view of a portion of a conventional rotor.
Figure 4B:
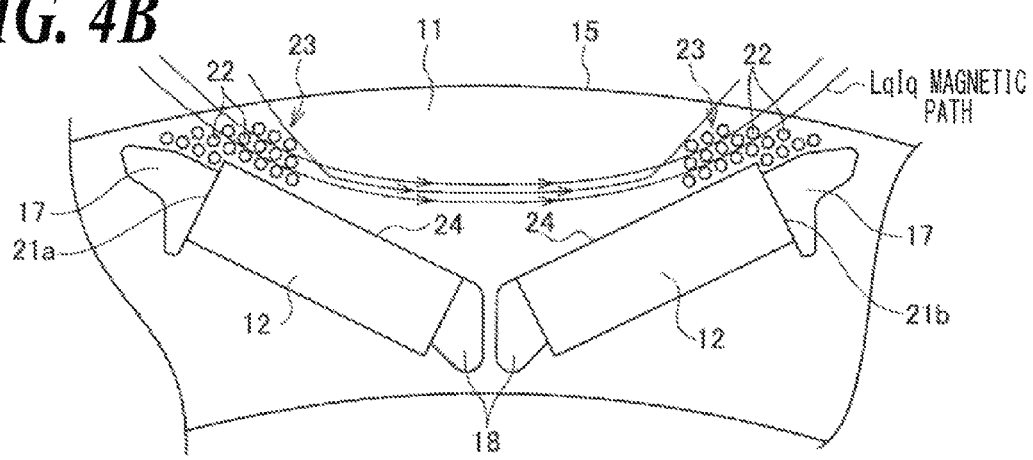
FIG. 4B shows an enlarged view of a portion of the rotor of the first embodiment.
Figure 4C:
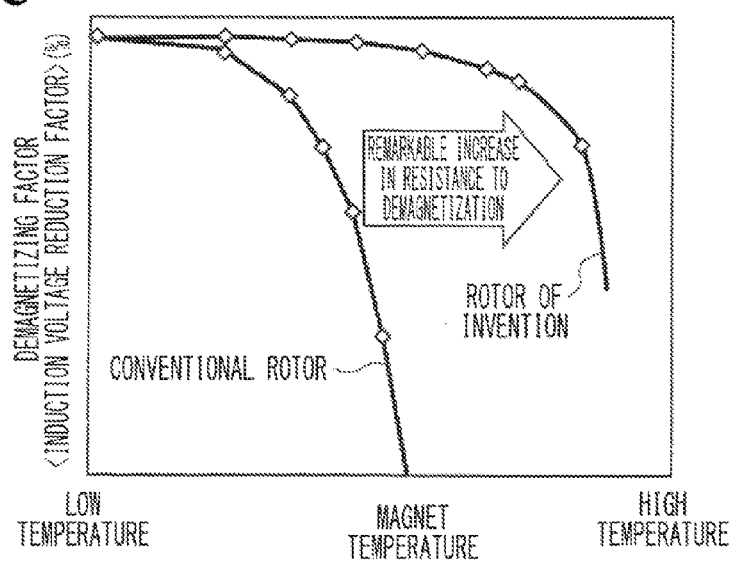
FIG. 4C shows a graph showing a comparison between a demagnetizing factor of the conventional rotor and a demagnetizing factor of the rotor of the invention.

FIG. 4C is a graph showing a comparison between a magnetizing factor of a conventional rotor shown in FIG. 4A and a magnetizing factor of the rotor (b) of this embodiment shown in FIG. 4B. It is seen that by disposing the void groups 23 each made up of the plural voids 22 on the outer circumferential sides of the circumferential end portions 21 (21a, 21b) of the permanent magnets 12, the demagnetizing field is dispersed and reduced to thereby increase the resistance to demagnetization largely. Although not shown, the position of the permanent magnet 12 where demagnetization is executed can also be controlled by adjusting the positions where the voids are disposed as required, this expanding the applicability of the invention to rotors of magnets whose coercive force is low.

Thus, as has been described heretofore, according to the rotor 10 of this embodiment, the void group 23 that is formed on the outer circumferential side of the circumferential end portion 21 of the permanent magnet 12 and that is made up of the plural voids 22 includes the first voids 22a and the second void row 32 that lies further radially outwards than the first voids 22a and where the second voids 22b are formed at the predetermined intervals P2. The rib 55 is formed between the pair of adjacent second voids 22b, 22b of the second void row 32. The end portions 41 of the first void 22a on both sides thereof in the direction along the outer circumferential surface 24 of the permanent magnet 12 overlap the pair of adjacent second voids 22b of the second void row 32 in the direction along the outer circumferential surface 24 of the permanent magnet 12 when seen from the direction normal to the outer circumferential surface 24 of the permanent magnet 12. In addition, the imaginary line 60 that extends along the center of the rib 55 in the width direction thereof passes through at least part of the first void 22a. This causes the demagnetizing field that acts from the direction normal to the outer circumferential surface 24 of the permanent magnet 12 to bypass the second voids 22b or the first voids 22a to pass while being divided at the ribs 55, 56, 57 that are formed between the voids 22a, 22b, thereafter the demagnetizing field acts on the end portion 21 of the permanent magnet 12. Consequently, the demagnetizing field that acts from the direction normal to the outer circumferential surface 24 of the permanent magnet 12 is restricted from acting directly on the end portion 21 of the permanent magnet 12, whereby the end portion 21 of the permanent magnet 12 can be restricted from being demagnetized by the demagnetizing field that acts from the direction normal to the outer circumferential surface 24 of the permanent magnet 12.

In addition, the void group 23 includes the first void row 31 where the plural first voids 22a are formed at the predetermined intervals P1 along the outer circumferential surface 24 of the permanent magnet 12. Therefore, the demagnetizing field can be dispersed in the direction along the outer circumferential surface 24 of the permanent magnet 12 more effectively.

Additionally, the angle θ formed between the first imaginary line 35 which connects the center O1 of the one of the pair of first voids 22a and the center O3 of the second void 22b and the second imaginary line 36 which connects the center O2 of the other first void 22a and the center O3 of the second void 22b is set to be θ<90°. Therefore, the other first void 22a is situated on the path of the demagnetizing field that passes through the rib 57 that is formed between the one first void 22a of the pair of first voids 22a and the second void 22b. Consequently, even though the demagnetizing field acts along the extending direction of the rib 57 that is formed between the one first void 22a of the pair of first voids 22a and the second void 22b, the demagnetizing field acting on the end portion 21 of the permanent magnet 12 is dispersed in the direction along the outer circumferential surface of the permanent magnet 12, whereby the demagnetization is restricted from occurring at the specific location.

Further, the voids 22 are formed into the circular shape when viewed from their axial direction, and therefore, an angular portion (a bent portion) can be restricted from being formed at part of the rib formed between the voids 22, whereby the stress resulting from a centrifugal force acting on the rotor core 11 when the rotor 10 rotates is dispersed to the whole of the rib, thereby making it possible to suppress the reduction in strength of the rotor core 11 effectively.

Further, the voids 22a, 22b, 22c of the void rows 31, 32, 33 that are situated at the magnetic pole center-side end portion of the void rows are disposed so as to lie closer to the outer end portion 21a, 21b of the magnetic pole in the order in which the void rows 31, 32, 33 are aligned from the outer circumferential surface 24 of the permanent magnet 12 towards the outer circumferential surface 15 of the rotor core 11 sequentially. Therefore, the propagation of the magnetic flux from the central portion of the magnetic pole to the outer end portion 21a, 21b of the magnetic pole can be suppressed effectively.

Additionally, the voids are disposed so as to lie closer to the outer end portion 21a, 21b of the magnetic pole in the order in which the void rows 31, 32, 33 are aligned from the outer circumferential surface 24 of the permanent magnet 12 towards the outer circumferential surface 15 of the rotor core 11. Therefore, it is easy to ensure the LqIq magnetic path (refer to FIG. 4B), and the inductance (Lq) in the q-axis direction becomes large. Therefore, the salient difference (Lq−Ld) can be increased to be large, thereby making it possible to generate the reluctance torque effectively.

Further, the void group 23 is formed to lie towards the outer circumferential surface 15 side of the rotor core 11 in the direction along the outer circumferential surface 24 of the permanent magnet 12 rather than at the circumferential end portion 21a, 21b of the outer circumferential surface 24 of the permanent magnet 12. Therefore, part of the demagnetizing field that acts on the outer circumferential surface 24 of the permanent magnet 12 can also be dispersed more to the outer circumferential surface 15 side of the rotor core 11 in the direction along the outer circumferential surface 24 of the permanent magnet 12 than to the circumferential outer end portion 21a, 21b of the outer circumferential surface 24 of the permanent magnet 12. Therefore, it is possible to restrict more effectively the demagnetization of the specific location of the end portion of the permanent magnet 12. In this embodiment, the first, second and side void rows 31, 32, 34 include the voids 22 in the position described above.

Figure 5:
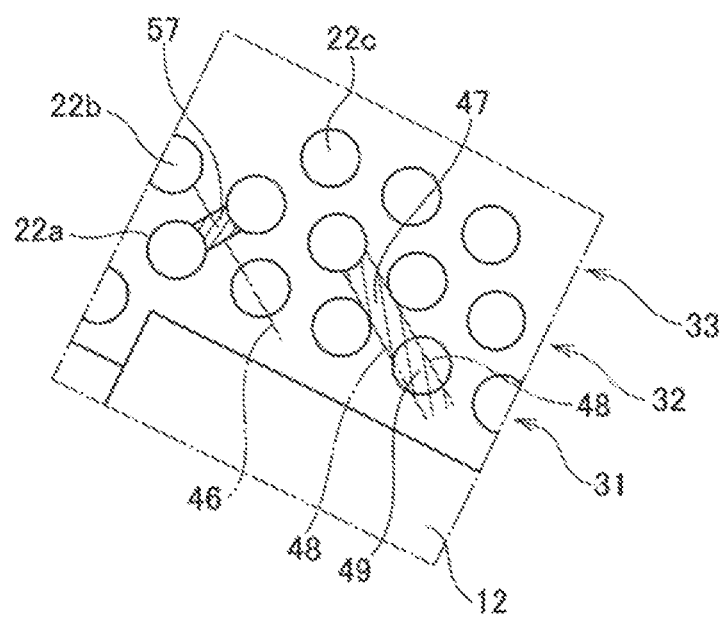
FIG. 5 is an enlarged view of the surrounded portion that is denoted by A in FIG. 2 which depicts another positional relationship between voids.

In this embodiment, the positional relationship of the voids may be specified as shown in FIG. 5. Namely, a rib 57 is formed between a second void 22b and one of a pair of first voids 22a, 22a, and an imaginary line 46 that extends along a center of the rib 57 in a width direction thereof passes through the other of the pair first voids 22a, 22a. In this configuration, the other of the pair of first voids 22a is positioned on a path of a demagnetizing field that passes through the rib 57 along the rib 57. Consequently, even though the demagnetizing field acts along the direction in which the rib 57 extends, the demagnetizing field can be dispersed effectively in the direction along the outer circumferential surface 24 of the permanent magnet 12, whereby it is possible to restrict the direct action of the demagnetizing field on the end portion 21 of the permanent magnet 12.

When the voids 22 are formed curvilinearly as into a circular shape or an elliptic shape, it can also be specified that at least part of the other of a pair of adjacent first voids 22a is situated within an area 49 sandwiched by tangents 48 to a second void 22b and one of the pair of adjacent first voids 22a at a portion 47 where the second void 22b and the one of the pair of adjacent first voids 22a come nearest to each other. The same advantage as that described above can be provided by this configuration.

Second Embodiment

Figure 6:
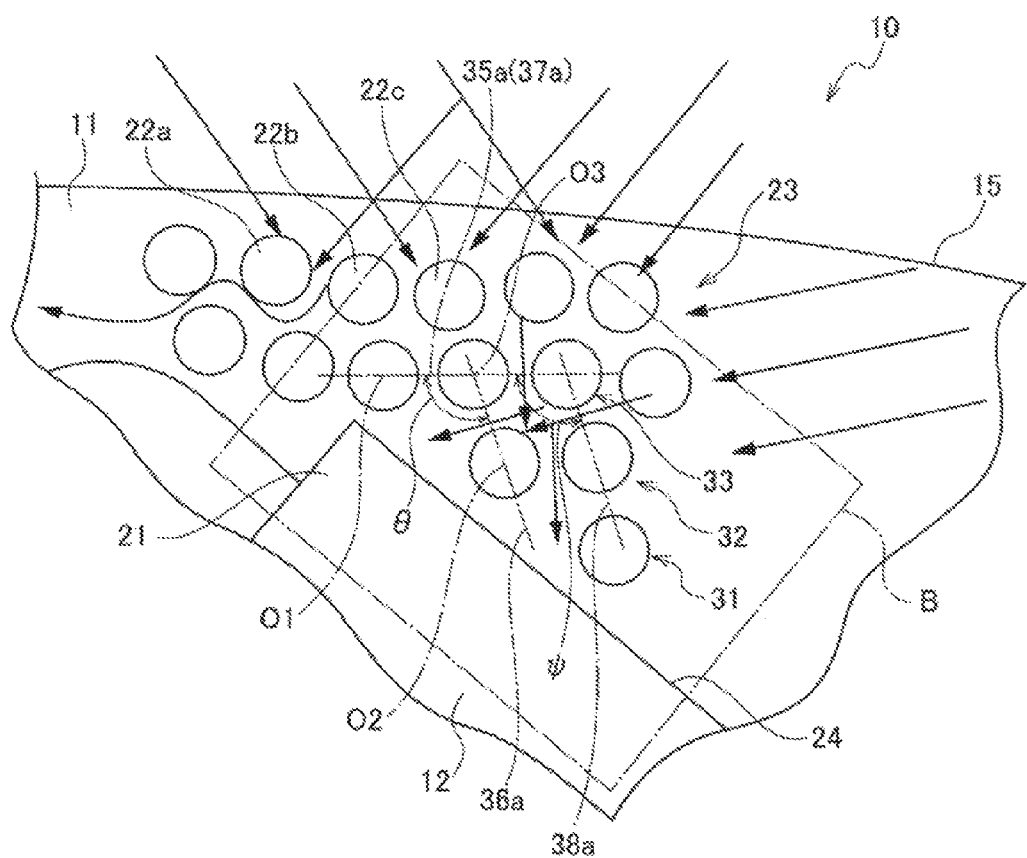
FIG. 6 is an enlarged view of a portion of a rotor of a second embodiment according to the invention.
Figure 7:
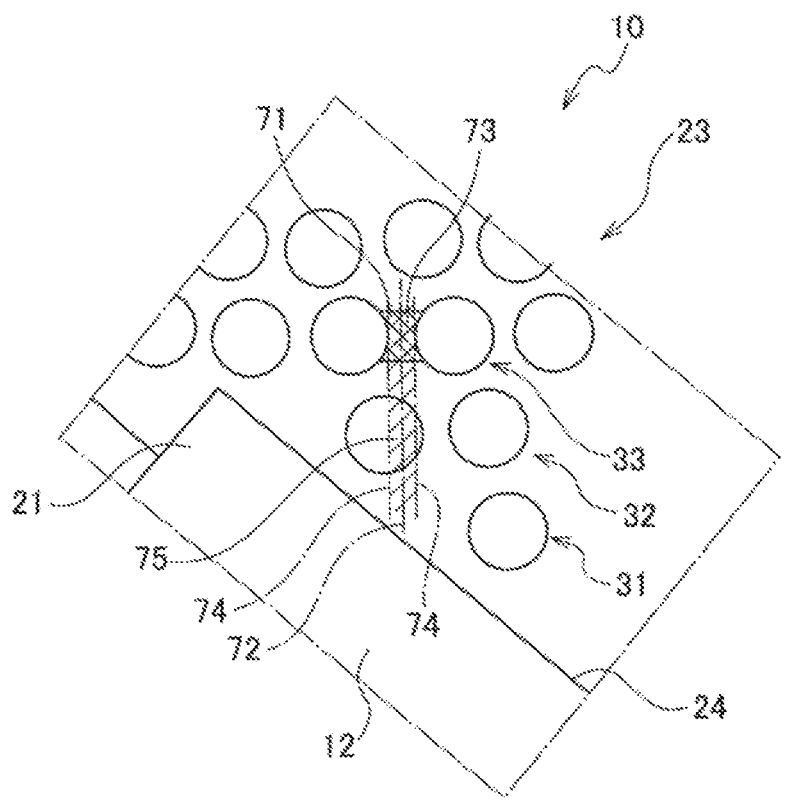
FIG. 7 is an enlarged view of a surrounded portion that is denoted by B in FIG. 6 which depicts a positional relationship between voids in the second embodiment.

FIG. 6 is an enlarged view of a portion of a rotor of a second embodiment according to the invention, and FIG. 7 is an enlarged view of a portion of the rotor which depicts a positional relationship of voids.

As shown in FIG. 6, in a void group 23, an angle θ formed between a first imaginary line 35a which connects a center O1 of one of a pair of adjacent first voids 22a and a center O3 of a second void 22b and a second imaginary line 36a which connects a center O2 of the other of the pair of first voids 22a and the center O3 of the second void 22b is set to be larger than 90° (θ>90°). In addition, an angle ψ formed between a third imaginary line 37a which connects the center O3 of one of a pair of adjacent second voids 22b and a center O5 of a third void 22c and a fourth imaginary line 38a which connects a center O4 of the other of the pair of second voids 22b and the center O5 of the third void 22c is also set to be larger than 90° (ψ>90°). In FIG. 6, although the first imaginary line 35a and the third imaginary line 37a are shown as constituting the same straight line, a configuration may be adopted in which the first imaginary line 35a and the third imaginary line 37a constitute separate straight lines.

As shown in FIG. 7, in the void group 23 where the voids are aligned with the angles θ, ψ set to be larger than 90°, a rib 71 is formed between a third void 22c and one of a pair of second voids 22b, and an imaginary line 72 that extends along a center of the rib 71 in a width direction thereof passes through a first void 22a. In this configuration, the first void 22a is situated on a path of a demagnetizing field that passes through the rib 71 along the rib 71. Consequently, even though the demagnetizing field acts along the extending direction of the rib 71, the demagnetizing field is restricted from acting directly on an end portion 21 of a permanent magnet 12, whereby the demagnetizing field that acts on the end portion 21 of the permanent magnet 12 can be dispersed effectively in the direction along an outer circumferential surface 24 of the permanent magnet 12.

Additionally, in this embodiment, too, the void group 23 is formed to lie towards an outer circumferential surface 15 side of a rotor core 11 in the direction along the outer circumferential surface 24 of the permanent magnet 12 rather than at the circumferential outer end portion 21 of the outer circumferential surface 24 of the permanent magnet 12. Therefore, part of the demagnetizing field acting on the outer circumferential surface 24 of the permanent magnet 12 can be dispersed by the rib between the voids 22 lying in the position described above.

The other configurations and working effects are the same as those of the rotor 10 of the first embodiment.

The specification of this embodiment can also be applied to a void group made up of polygonal voids as will be described in a fourth embodiment, which will be described later.

In addition, in this embodiment, when the voids 22 are formed curvilinearly as into a circular shape or an elliptic shape, it can also be specified that at least part of the first voids 22a is situated within an area 75 sandwiched by tangents 74 to a third void 22c and one of the second voids 22b at a portion 73 where the third void 22c and the one of the pair of adjacent second voids 22b come nearest to each other. The same advantage as that described above can be provided by this configuration.

Third Embodiment

Figure 8A:
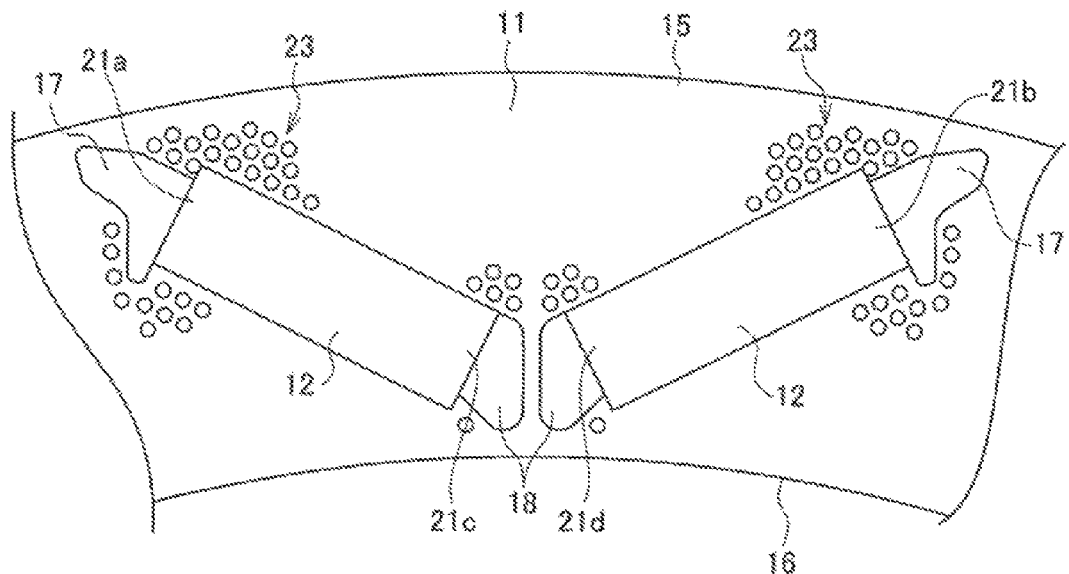
FIG. 8A shows an enlarged view of a portion of a rotor of a third embodiment and FIG. 8B shows an enlarged view of a portion of a rotor of a modified example of the third embodiment.

FIG. 8A is an enlarged view of a portion of a rotor of third embodiment. Void groups 23 are disposed, near end portions 21a, 21b of the permanent magnets 12, not only on outer circumferential sides of outer circumferential surfaces 24 of the permanent magnets 12 but also on inner circumferential sides of inner circumferential surfaces. Additionally, void groups 23 are disposed, near the other end portions 21c, 21d of the permanent magnets 12, on outer circumferential sides of outer circumferential surfaces 24 of permanent magnets 12 and on the inner circumferential sides of the inner circumferential surfaces.

Figure 8B:
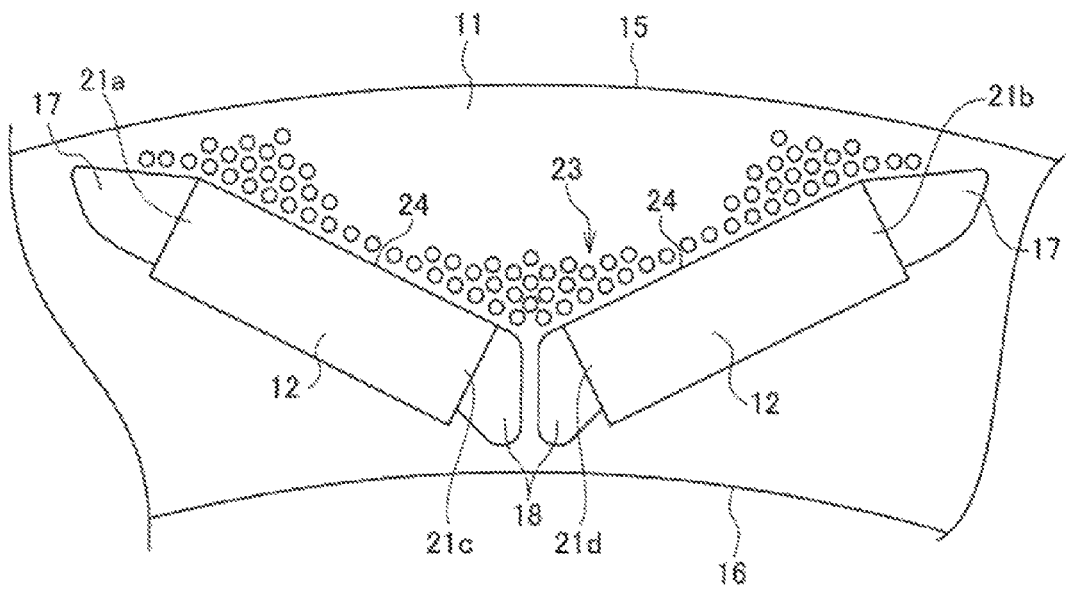

In addition, FIG. 8B is an enlarged view of a portion of a rotor of a modified example of the third embodiment. Void groups 23 continue along outer circumferential surfaces 24 of permanent magnets 12 and are formed so that the number of rows of voids is increased towards both longitudinal end portions 21a, 21b, 21c, 21d of the permanent magnets 12.

In either case, demagnetizing fields that attempt to act on the end portions of the permanent magnets 12 that lie closer to an inner circumferential surface 16 of a rotor core 11 can be restricted by the void groups 23.

Fourth Embodiment

Figure 9A:
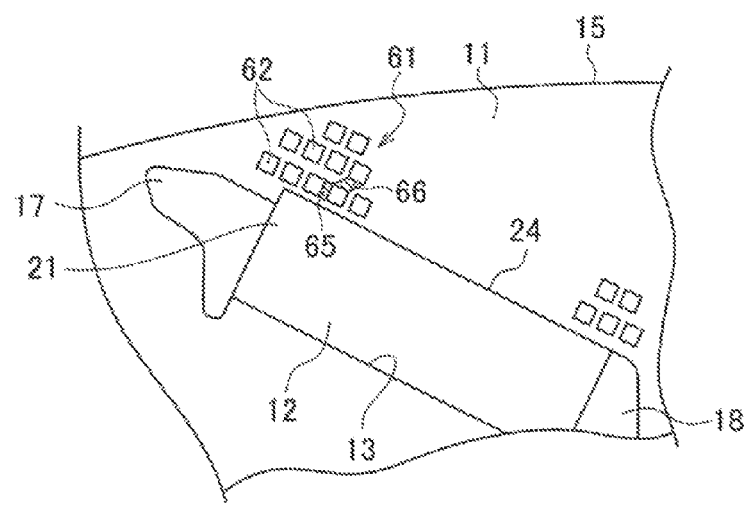
FIG. 9A shows an enlarged view of a portion of a rotor of a fourth embodiment of the invention.
Figure 9B:
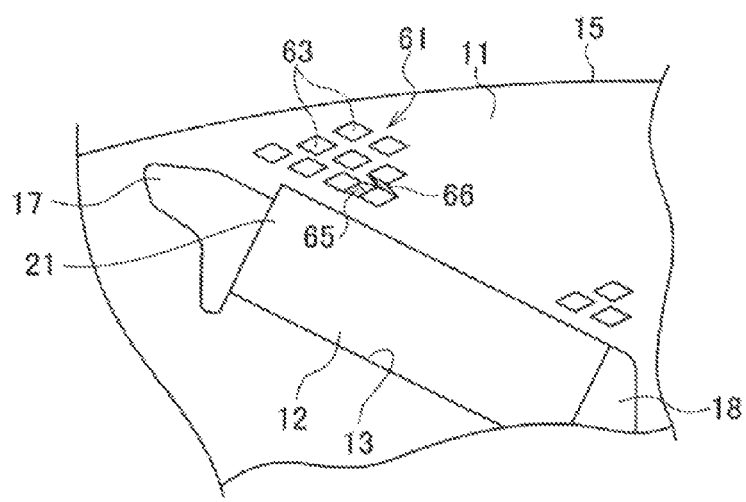
FIG. 9B shows an enlarged view of a portion of a rotor of a modified example of the fourth embodiment.
Figure 9C:
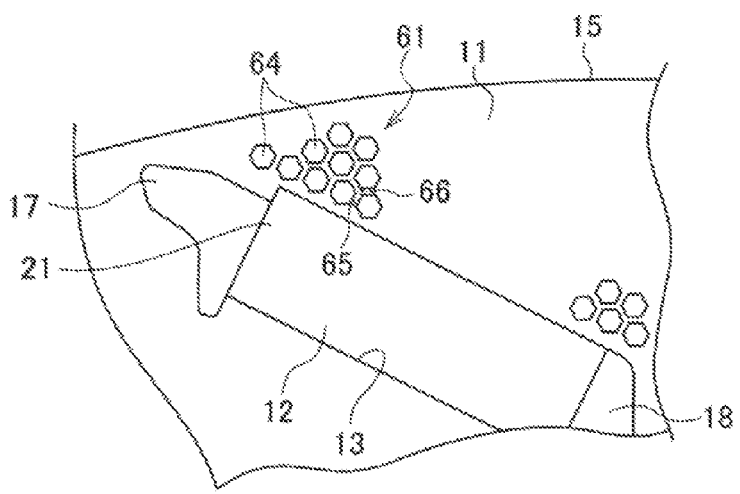
FIG. 9C shows an enlarged view of a portion of a rotor of another modified example of the fourth embodiment.

FIG. 9A-9C show enlarged views of portions of rotors according to a fourth embodiment and its modified examples. In FIG. 9A, a void group 61 is formed of square voids 62 as polygonal voids, in FIG. 9B, a void group 61 is formed of rhombus voids 63, and in FIG. 9C, a void group 61 is formed of regular hexagonal voids 64. In any of the voids 62, 63, 64, a second void is formed between adjacent first voids, and a third void is formed between adjacent second voids. Namely, the voids 62, 63, 64 of the adjacent void rows are disposed so as to be offset by substantially half a pitch along an outer circumferential surface 24 of a permanent magnet 12.

Figure 10:
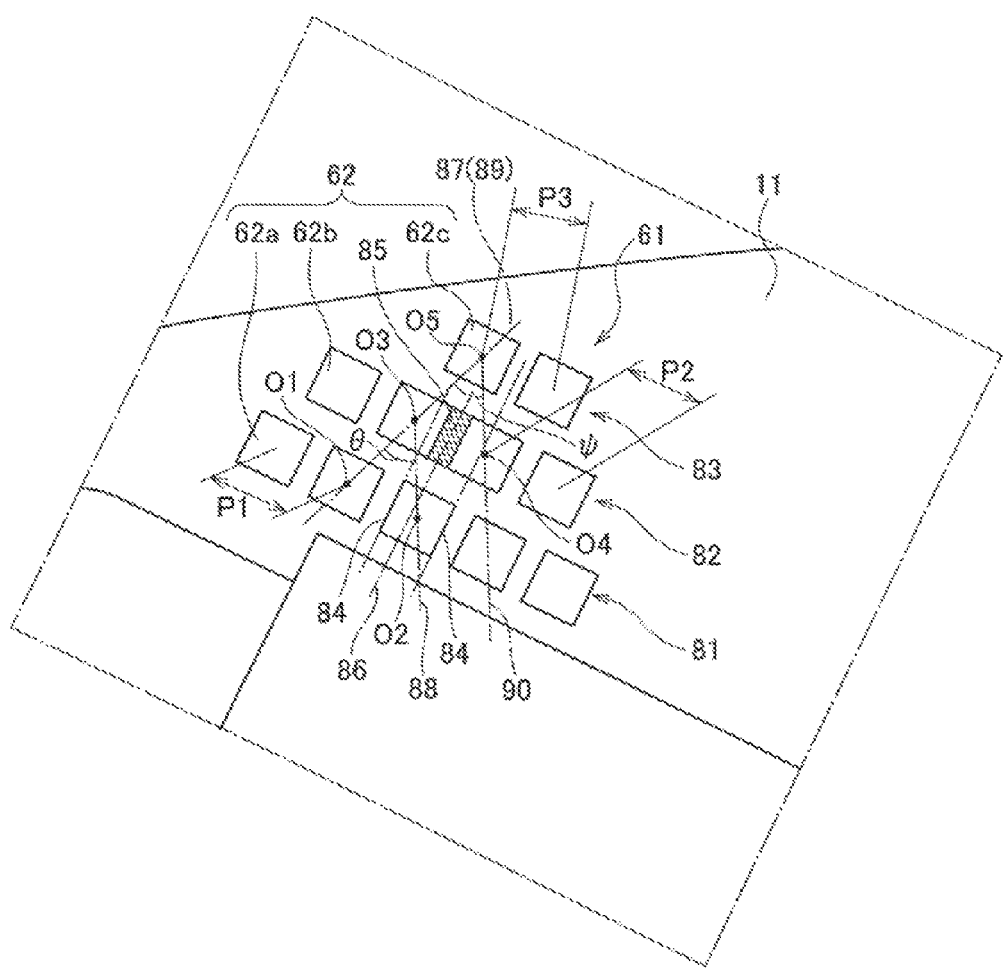
FIG. 10 is an enlarged view which depicts a positional relationship between voids shown in FIG. 9A.
Figure 11:
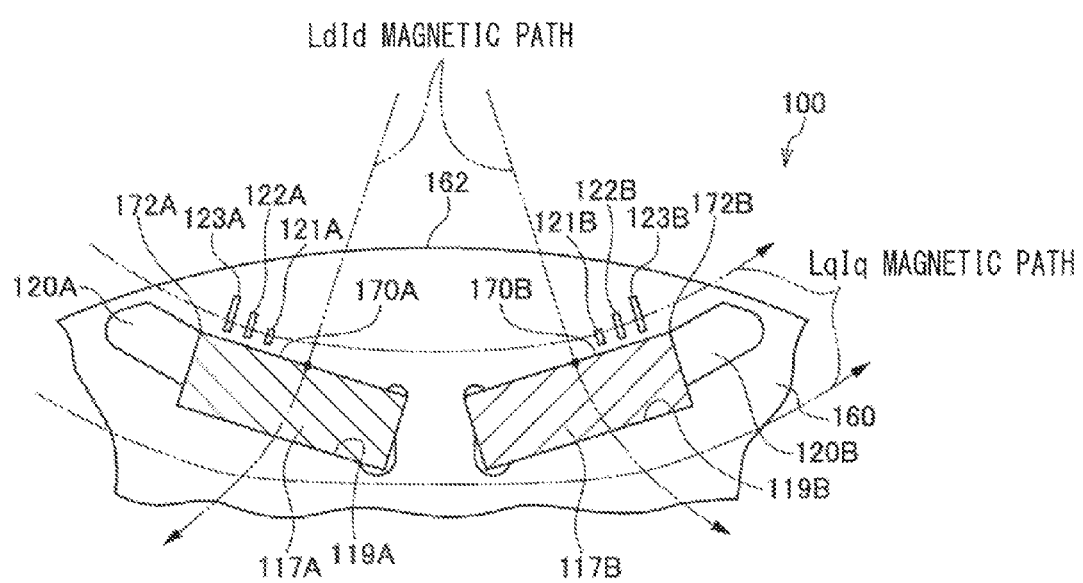
FIG. 11 is an enlarged view of a portion of the conventional rotor.

In this way, although the voids have the different shapes, the same specification as those made in the embodiments can be made, and the same advantage as those provided by the embodiments can also be provided by this embodiment. For example, in the case of the square voids 62 shown in FIG. 9A, as shown in FIG. 10, when seen from an axial direction, the void group 61 includes a first void row 81 formed of plural first voids 62a that are formed at first intervals P1 along the outer circumferential surface 24 of the permanent magnet 12, a second void row 82 that lies further radially outwards than the first void row 81 and that is formed of plural second voids 62b that are formed at second intervals P2 along the outer circumferential surface 24 of the permanent magnet 12, and a third void row 83 that lies further radially outwards than the second void row 82 and that is formed of plural third voids 62c that are formed at third intervals P3 along the outer circumferential surface 24 of the permanent magnet 12.

Then, a rib 85 is formed between a pair of adjacent second voids 62b of the second void row 82. Additionally, end portions 84 of the first void 62a on both at sides thereof in a direction along the outer circumferential surface 24 of the permanent magnet 12 overlap a pair of adjacent second voids 62b of the second void row 82 in the direction along the outer circumferential surface 24 of the permanent magnet 12 when seen from a direction parallel to an imaginary line 86 that extends along a center of the rib 85 in a width direction thereof, and the imaginary line 86 that extends along the center of the rib 85 in the width direction thereof passes through at least part of the first void 62a.

In this case, too, assuming that an angle is $\theta$ which is formed between a first imaginary line 87 which connects a center O1 of one of a pair of adjacent first voids 62a and a center O3 of a second void 62b and a second imaginary line 88 which connects a center O2 of the other of the pair of first voids 62a and the center O3 of the second void 22b, $\theta<90°$. In addition, an angle $\psi$ formed between a third imaginary line 89 which connects the center O3 of one of a pair of adjacent second voids 22b and a center O5 of a third void 22c and a fourth imaginary line 90 which connects a center O4 of the other of the pair of second voids 22b and the center O5 of the third void 22c is also set to be smaller than 90° ($\psi<90°$). In FIG. 10, although the first imaginary line 87 and the third imaginary line 89 are shown as constituting the same straight line, a configuration may be adopted in which the first imaginary line 87 and the third imaginary line 89 constitute different straight lines.

According to the rotor 10 of this embodiment, when seen from the axial direction, the voids 62, 63, 64 are formed into the polygonal shapes such as the regular hexagonal shape, and therefore, the thickness of a rib 65 between the voids 62, 63, 64 in one void row and the thickness of a rib 66 between the voids of the adjacent void rows can be made uniform, whereby a local reduction in strength of the ribs 65, 66 is restricted. Consequently, the reduction in strength of the ribs 65, 66 can be restricted while ensuring the size of the voids 62, 63, 64.

The invention is not limited to the embodiments and their modified examples and hence can be modified or improved as required.

In the embodiments, while the polarities of the permanent magnets are made to change alternately by each pair of magnet insertion holes 13 of the rotor core 11, the polarities may be made to change by each magnet insertion hole 13.

As this occurs, the void group may be provided on the outer circumferential side of each of the longitudinal end portions of the permanent magnet 12. Additionally, the invention is not limited to the configuration in which the pair of magnet insertion holes act jointly to form the V shape, and hence, the invention can also be applied to a configuration in which a pair of magnet insertion holes are aligned with each other into a straight line. As this occurs, too, at least the void group should be provided on the outer circumferential side of the longitudinal outer end portion of the permanent magnet.

The invention is based on Japanese Patent Application (No. 2012-089528) filed on Apr. 10, 2012, the contents of which are incorporated herein by reference.

DESCRIPTION OF REFERENCE NUMERALS AND CHARACTERS 10 rotor; 11 rotor core; 12, 12a, 12b permanent magnet; 13 magnet insertion hole; 21, 21a, 21b longitudinal outer end portion; 22 void; 22a, 62a first void; 22b, 62b second void; 22c, 62c third void; 23, 61 void group; 24 outer circumferential surface of permanent magnet; 31, 81 first void row; 32, 82 second void row; 33, 83 third void row; 35, 35a first imaginary line; 36, 36a second imaginary line; 41 end portion of first void; 55, 56, 57, 71 rib; 46, 60, 72 imaginary line; 62 square void (polygonal void); 63 rhombus void (polygonal void); 64 regular hexagonal void (polygonal void); O1 center of one of a pair of adjacent first voids; O2 center of the other of a pair of adjacent first voids; O3 center of second void; P1 interval: P2 interval; P3 interval; $\theta$, $\psi$ angle.

The invention claimed is:

1. A rotating electric machine rotor comprising:
   a rotor core in which a magnet insertion hole is formed; and
   a permanent magnet that is inserted in the magnet insertion hole, wherein:
   a void group made up of plural voids is formed on an outer circumferential side of a longitudinal end portion of the permanent magnet;
   the void group comprises:
      a first void; and
      a second void row where plural second voids are formed at predetermined intervals at a position further radially outwards than the first void;
   a rib is formed between a pair of adjacent second voids of the second void row;
   when seen from a direction parallel to an imaginary line that extends along a center of the rib in a width direction thereof, end portions of the first void on both sides thereof in a direction along an outer circumferential surface of the permanent magnet respectively overlap the pair of adjacent second voids of the second void row in the direction along the outer circumferential surface of the permanent magnet;
   the imaginary line that extends along the center of the rib in the width direction thereof passes through at least part of the first void; and
   a magnetic pole center-side end portion of the void group extends from the outer circumferential surface of the permanent magnet towards an outer circumferential surface of the rotor core.

2. The rotating electric machine rotor according to claim 1, wherein the void group includes a first void row where a plurality of the first voids are formed at predetermined intervals along the outer circumferential surface of the permanent magnet.

3. The rotating electric machine rotor according to claim 2, wherein
when a first imaginary line that connects a center of one of a pair of adjacent first voids and a center of the second void forms an angle of θ with a secondary imaginary line that connects a center of the other of the pair of first voids and the center of the second void, θ<90°.

4. The rotating electric machine rotor according to claim 1, wherein
when seen from an axial direction, the voids each is formed into a circular shape.

5. The rotating electric machine rotor according to claim 1, wherein
when seen from an axial direction, the voids each is formed into a polygonal shape.

6. The rotating electric machine rotor according to claim 5, wherein
when seen from the axial direction, the voids each is formed substantially into a regular hexagonal shape.

7. The rotating electric machine rotor according to claim 1, wherein
the voids on magnetic pole center-side ends of the void rows are disposed closer to a magnetic pole end side in an order of the void rows aligned from the outer circumferential surface of the permanent magnet towards the outer circumferential surface of the rotor core.

8. The rotating electric machine rotor according to claim 2, wherein
the void group is formed closer to an outer circumferential surface side of the rotor core in the direction along the outer circumferential surface of the permanent magnet rather than a circumferential end portion of the outer circumferential surface of the permanent magnet.

9. A rotating electric machine rotor comprising:
a rotor core in which a magnet insertion hole is formed; and
a permanent magnet that is inserted in the magnet insertion hole, wherein:
a void group made up of plural voids is formed on an outer circumferential side of a longitudinal end portion of the permanent magnet;
the void group comprises:
   a first void row where plural first voids are formed at predetermined intervals along an outer circumferential surface of the permanent magnet when seen from an axial direction; and
   a second void that is formed between a pair of adjacent first voids at a position further radially outwards than the first void row;
a rib is formed between the second void and one of the pair of first voids;
an imaginary line that extends along a center of the rib in a width direction thereof passes through the other of the pair of first voids;
a magnetic pole center-side end portion of the void group extends from the outer circumferential surface of the permanent magnet towards an outer circumferential surface of the rotor core.

10. A rotating electric machine rotor comprising:
a rotor core in which a magnet insertion hole is formed; and
a permanent magnet that is inserted in the magnet insertion hole, wherein:
a void group made up of plural voids is formed on an outer circumferential side of a longitudinal end portion of the permanent magnet;
the void group comprises:
   a first void row where plural first voids are formed at first intervals along an outer circumferential surface of the permanent magnet when seen from an axial direction;
   a second void row where plural second voids are formed at second intervals along the outer circumferential surface of the permanent magnet at a position further radially outwards than the first void row; and
   a third void that is formed between a pair of adjacent second voids at a position further radially outwards than the second void row;
a rib is formed between the third void and one of the pair of second voids;
an imaginary line that extends along a center of the rib in a width direction thereof passes through the first void; and
a magnetic pole center-side end portion of the void group extends from the outer circumferential surface of the permanent magnet towards an outer circumferential surface of the rotor core.

* * * * *